UNITED STATES PATENT OFFICE 2,430,923

N-ALKOXYMETHYL POLYAMIDES AND METHOD FOR OBTAINING SAME

Henry D. Foster, Wilmington, Del., and Arthur W. Larchar, Mendenhall, Pa., assignors to E. I. du Pont de Nemours & Company, Wilmington, Del., a corporation of Delaware No Drawing. Application September 20, 1943, Serial No. 503,130

9 Claims. (Cl. 260—72)

This invention relates to polymeric materials and more particularly to the manufacture of modified polyamides of the nylon type.

The polyamides with which this invention is concerned are of the general kind described in United States Patents 2,071,250, 2,071,253 and 2,130,948. A method has been developed for the chemical modification of the polyamides to yield polymers readily soluble in hot ethanol and other common and inexpensive solvents in which the polyamides are otherwise insoluble unless derived from special or expensive reactants or from complicated multi-ingredient systems. These soluble polymers are obtained by converting polyamides of the above mentioned kind which have a hydrogen-bearing amide group to N-alkoxymethyl polyamides. One method for accomplishing this result consists in reacting a solution of the polyamide in formic or other organic acid with formaldehyde and an alcohol. This procedure converts the functional group

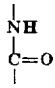

in the case of the polycarbo-amides, to the functional group

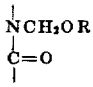

where R is the organic radical derived from the alcohol used. The reaction apparently proceeds through the formation by the formaldehyde of N-methylol polyamide and then by the etherification of the —CH$_2$OH group by the alcohol present to the alkoxymethyl group.

This invention has as an object a new and improved method for obtaining polyamides of increased solubility in organic solvents. A further object is a method for manufacturing N-alkoxymethyl polyamides in which duplication of results with regard to a desired degree of substitution can be easily obtained. A further object is a method for making these polymers in which the cheaper forms of formaldehyde and formic acid can be used and in which a higher ratio of N-alkoxymethyl to N-methylol groups can be obtained than has previously been possible. Other objects will appear hereinafter.

The above objects are accomplished by the method more fully described hereinafter wherein an organic solvent solution of synthetic linear polyamide having a hydrogen-bearing amide group is reacted with formaldehyde and an alcohol, then after the reaction has started adding further alcohol to the reaction mixture, and continuing the reaction until an alkoxymethyl polyamide having the desired degree of alkoxymethyl substitution is obtained. The polymers used as the initial material in the practice of this invention contain amide (e. g., carbonamide, thioamide, or sulfonamide groups) as an integral part of the main chain of atoms in the polymer. These polyamides are obtained from polymer-forming compositions consisting of bifunctional reactants containing complementary reacting groups, e. g., carboxyl and amino groups, in substantially equimolecular amounts. The products are the high molecular weight or fiber-forming polymers, e. g., those having an intrinsic viscosity above 0.4 as defined in United States Patent 2,130,948.

This procedure of conducting the reaction which involves withholding a portion of the alcohol from the initial reaction mixture and adding it at a later period has been found to be a means by which the degree of substitution and the nature of the substitution obtained in a given total reaction time and for a given total amount of alcohol can be controlled to a remarkable degree by the time the second stage addition of alcohol is made after beginning of the initial reaction and before its completion, and by the amount of the alcohol withheld for the second stage addition.

The precise control possible by varying only the time of the second stage addition will be seen from the following data in which all experiments were conducted using 1 part polyhexamethylene adipamide, 1.2 parts of 80% aqueous formaldehyde, and 2 parts alcohol for a total time of thirty minutes at a temperature of 60° C. and with the same total quantity of alcohol. In the first experiment all the alcohol, methanol, was included in the original reaction mixture and the product after thirty minutes of reaction had an alkoxymethyl content of 2.5% and a methylol content of 1.2%. This corresponds to a 9.5% conversion of the original amide groups in the polymer into N-alkoxymethyl amide groups and a 4.5% conversion into N-methylol amide groups. In the second experiment 50% of the total alcohol was withheld until the reaction with the initial 50% of the alcohol has proceeded for five minutes, and the reaction was continued for the remaining twenty-five minutes. The polyamide obtained had an alkoxymethyl content of 4.8% (representing 19% conversion of the original amide groups into N-alkoxymethyl amide groups) and a methylol content of 1.0% (representing 4.0% conversion of the amide groups into N-methylol amide groups). Subsequent experiments were similarly performed with later addition of 50% of the alcohol at 10, 15, 20 and 25 minutes with continued reaction of 20, 15, 10 and 5 minutes, respectively. The third experiment in which the second stage alcohol was added after ten minutes resulted in an alkoxymethyl content of 6.1% (24% conversion) and a methylol content of 1.0% (4% conversion); in the fourth experiment in which the second stage alcohol was added after fifteen minutes there was obtained an alkoxymethyl content of 7.0% (28.5% conversion) and a methylol content of 0.9% (3.5% conversion); in the fifth experiment in which the second stage alcohol was added after twenty minutes there was obtained an alkoxymethyl content of 8.0% (32% conversion) and a methylol content of 0.8% (3% conversion); and in the sixth experiment involving twenty-five minutes later addition of the alcohol there was obtained an alkoxymethyl content of 8.5% (35% conversion) and a methylol content of 0.6% (2% conversion).

The degree of solubility of the product, which is a measure of the degree of substitution of N-alkoxymethyl groups, is given herein in terms of its "dilution value." The dilution value is readily determined as follows: One gram of the N-alkoxymethyl polyamide to be tested is dissolved by reflux in 20 cc. of an ethanol water mixture consisting by weight of 80 parts ethanol and 20 parts water. Acetone is then added slowly while maintaining the solution at reflux temperature until a slight cloudiness persists in the solution. This point is taken as the end point and the number of cc. of acetone required to reach this stage is called the dilution value. Dilution values of 15 to 38 correspond to approximately 14% to 25% of the amide groups substituted, and dilution values of 38 to 48 correspond to approximately 25% to 38% substitution, which for many uses of the present polymers represents the minimum substitution consistent with adequate solubility and with the solution stability desired. The production of polymers within this latter range of substitution involves withholding from 30% to 80% of the alcohol, and usually about 50% until the reaction has been underway for a period between 10 and 25 minutes.

Although it is usually desirable to make the second stage addition of alcohol such that products of the higher dilution values mentioned above are obtained, the invention is advantageously practiced by adding the second stage alcohol at any appreciable time interval after the initial reaction with a substantial portion of the alcohol. Thus considering the degree of substitution obtained by reacting all the alcohol initially as the first point on a curve drawn through the remaining points that indicate the degree of substitution due only to the time that second stage alcohol is added to give with equal amounts of initially used alcohol the same total amount in all instances, the degree of substitution begins to rise immediately with addition of the "second stage alcohol," i. e., the alcohol withheld at beginning the reaction, and this rise continues and is closely proportional to the time of the second addition up to about 38% substitution where still longer time intervals for adding the second stage alcohol begins to have substantially less effect on the increase in the degree of alkoxymethyl substitution. But even with small time intervals such as two minutes (where, on the basis of the data previously given for subsequent additions of 50% of the total alcohol, the degree of substitution has risen 25% over that obtained by initially reacting all the alcohol), there is, aside from increase in degree of substitution, a definite advantage in the fact that the desired degree of substitution and hence of solubility can be duplicated through the remarkable control made possible by the present discovery of the effect of timed addition of alcohol to the reaction mixture.

The amount of alcohol, expressed as parts by weight for one part of weight of the polyamide in solution, used in the initial reaction and that withheld for later addition can vary widely, but the best results are obtained by using from 0.5 part to 1.5 parts alcohol for one part polyamide in the initial reaction, and from 0.50 part to 4 parts alcohol for one part polyamide in the subsequent addition. It is desirable that the withheld alcohol be added in amount either equal or in excess of the amount used as the initial or as the first stage alcohol.

The preferred method for practicing the invention, which is essentially that used in obtaining the data previously given, is as follows wherein the parts given here and elsewhere are by weight based on the weight of the polyamide. One part of fiber-forming polyhexamethylene adipamide (intrinsic viscosity above about 0.4) is cut to pass through a one-fourth inch screen and is dissolved in 2 parts of 90% formic acid at 60° C. in a closed agitated vessel equipped with a reflux condenser. The polymer shows less tendency to form lumps if added to the acid. A solution of 1.2 parts of 80% formaldehyde, 1 part of methanol, known as initial methanol, and sufficient sodium hydroxide to make the mix alkaline to litmus, is made and heated to 60° C. in a closed, stirred, refluxed vessel. Thirty-three hundredths parts of methyl formate is added to the aldehyde solution and serves to prevent gelation of the reaction mixture. The aldehyde solution is then added to the polyamide solution with good agitation. Addition is slow at the start to avoid permanent precipitation of the polyamide but may be rapid after the first minute and is complete in 3.5 minutes. The temperature of the reaction mixture is maintained at 60° C. ±2°. Nineteen minutes later, 1 part of methanol known as "second-stage methanol" is added and the reaction continued for eleven minutes bringing the total reaction time measured after completion of aldehyde addition to 30 minutes. The reaction mixture is passed through a strainer into a closed, refluxed, agitated precipitation tank and methyl formate is added to precipitate the product, N-methoxymethyl polyhexamethylene adipamide. The product is separated from the mother liquor by centrifugation or filtration and is thoroughly washed by reslurrying several times with water. This procedure yields a polymer having a dilution value of about 43 which corresponds approximately to 31% of the amide groups substituted with methoxymethyl groups.

The N-alkoxymethyl polyamide, unless specially treated, contains some free N-methylol groups. It is usually desirable that this type of substitution be held to a minimum since these groups undergo hydrolysis in hot aqueous alcohol solution and thus decrease the total substitution and therewith the solubility characteristic of the product. The N-methylol content can be controlled by the multi-stage addition of methanol, and can be reduced to a negligible amount (0.3%)

without interfering with the control of total substitution by the addition of a larger amount of methanol near the end of the reaction period. This method for reducing the N-methylol content by means of a third-stage methanol is illustrated in Example 11. The effect on the methylol content and the dilution value, which is an approximate measure of the total substitution, of adding various amounts of second-stage methanol near the end of the reaction period is also shown in the following examples.

The invention is further illustrated by the following examples in which the parts are by weight.

Example I

Two parts of 90% formic acid (commercial grade, sp. gr.=1.20) was charged into a glass lined reaction vessel equipped with a reflux condenser and an anchor type stirrer. One part of polyhexamethylene adipamide (intrinsic viscosity=1.0) pulverized to pass a ¼" screen was then added and the agitator started. This mixture was heated to 60° C. and solution was complete within 90 minutes. A second solution consisting of 1.2 parts of 80% formaldehyde, 1 part of methanol, and 0.0006 part of sodium hydroxide was prepared at 60° C. and ⅓ part of methyl formate was added to it. This formaldehyde solution was added to the polyamide solution over a 3½ minute period with good agitation. The reaction mixture was maintained at 58° C. Nineteen minutes after all the aldehyde solution had been added, one part of second-stage methanol was added to the reaction mixture. Eleven minutes later the reaction mixture was discharged into a precipitation tank equipped with a stirrer, and 22.5 parts of methyl formate was added with good agitation. The product precipitated in a finely divided, free-settling granular form. The precipitated product, N-methoxymethyl polyhexamethylene adipamide, was separated from the mother liquor by centrifugation and washed by reslurrying with water, then with a 0.5% ammonia solution, and finally with water. The centrifuged product was dried in an air drier at room temperature.

The product obtained in accordance with the above example contained 7.9% by weight of methoxyl groups which corresponds to 32% of the amide groups converted to N-methoxymethylamide groups; it also contained 0.6% by weight of methylol groups which corresponds to 2% of the amide groups converted to N-methylolamide groups, therefore the total substitution was 34% and the ratio of methoxyl to methylol groups was 16 to 1. The dilution value of this product was 45.5 and solutions containing at least 35% solids could be prepared in aqueous alcohol solvents such as 70:30 ethanol-water and 80:20 methanol-water. These solutions were stable (toward gelation) for several days when maintained at 75° C.

Example II

Three parts of 90% formic acid (sp.gr.=1.20) was charged into an open stainless steel reaction vessel, equipped with a stirrer, 1 part of polyhexamethylene adipamide (intrinsic viscosity=1.0) pulverized to pass a ¼" screen was added, the mixture was heated to 60° C. and solution was complete within 60 minutes. A second solution consisting of 0.933 part of paraformaldehyde (95% aldehyde), 1 part of methanol, and 0.0006 part of sodium hydroxide was prepared at 60° C. in an open stainless steel vessel and 0.5 part of methyl formate was added. This second solution was added to the polyamide solution over a 3½ minute period with good agitation. The reaction mixture was maintained at 60° C. and 8 minutes after all the aldehyde solution had been added 1 part of second-stage methanol was added to the reaction mixture. Seventeen minutes later (25 minutes after all the aldehyde solution had been added) 2 parts of third-stage methanol was added and 5 minutes later the reaction mixture was discharged into a precipitation tank containing 28 parts of cold aqueous acetone (44% acetone by weight). The resulting solution was stirred vigorously and neutralized with aqueous ammonia. The product, N-methoxymethyl polyhexamethylene adipamide, precipitated in finely divided, free-settling, granular form. It was separated from the mother liquor by centrifugation and washed by reslurrying with water. The centrifuged product was dried in vacuum at 50° C.

The product obtained by the procedure of the above example contained 8% methoxyl groups and 0.3% methylol groups which means that about 34% of the amide groups in the original polyamide were substituted. The ratio of methoxyl to methylol groups was about 27 to 1 and the dilution value was 45.5.

Example III

Three parts of 90% formic acid (sp. gr.=1.20) was charged into a stainless steel stirred vessel, 1 part of fiber-forming polyhexamethylene adipamide was added, the mixture was heated to 60° C. and solution was complete within 60 minutes. A second solution consisting of 1 part of paraformaldehyde (95% aldehyde), 1 part of methanol, and 0.0006 part of sodium hydroxide was prepared at 60° C. in a stainless steel vessel. This solution was added to the polyamide solution over a 3½ minute period with good agitation. The reaction mixture was maintained at 60° C. and 10 minutes later 1 part of second-stage methanol was added to the reaction. Twenty minutes later the reaction mixture was discharged into 28 parts of 44% aqueous acetone and the resulting solution neutralized with aqueous ammonia. The product precipitated in a granular form and was separated from the mother liquor by centrifugation. The centrifuged product was washed by reslurrying and then dried at room temperature.

The reaction product obtained by the method of the foregoing example contained 7.3% methoxyl groups and 1.2% methylol groups which means about 35% of the amide groups in the original polyamide were substituted. The ratio of the methoxyl to methylol groups was about 6 to 1 and the dilution value was 43.5. Solutions of this product containing 30% solid in 70:30 ethanol/water were stable (no gelation) for ten days when maintained at 75° C. Films prepared from these solutions had a tensile strength of 4700 lbs./sq. in. and an elongation at break of 500%.

Example IV

Two parts of 90% formic acid (sp. gr.=1.20) was charged into a glass reaction vessel and 1 part of polyhexamethylene adipamide (intrinsic viscosity=1.2) was added. The mixture was heated with stirring at 60° C. until solution was complete. This required about 90 minutes. A second solution consisting of 1.2 parts of 80% formaldehyde, 1 part of methanol, and 0.0006 part of sodium hydroxide was prepared at 60° C. in a glass vessel and 0.33 part of methyl formate was added. This solution was added to the polyamide solution over a 3½ minute period with good agitation. The reaction mixture was maintained at 60° C. and 11.5 minutes later 1 part of second-stage methanol was added; then, 18.5 minutes later the reaction mixture was discharged into a Day cellulose shredder containing 7.5 parts of water. After working the mixture for 3 minutes the shredder was stopped, 6.3 parts of supernatant mother liquor drained off, and 4.2 parts of water added. Working of the shredder was resumed and within 8 minutes the polymer granulated. Fifteen minutes after the reaction mixture was introduced into the shredder, the shredder was stopped and the mother liquor drained off. The prepolymer was then centrifuged, slurried once with water, once with 0.5% aqueous ammonia, twice with water, and dried at room temperature.

The reaction product had a dilution value of 35 and approximately 26% of the amide groups in the original polyamide were substituted with methoxymethyl and methylol groups.

Example V

Two parts of 90% formic acid (sp. gr.=1.20) and 1.5 parts of acetic anhydride (95%) were charged into a stirred, glass reaction vessel, 1 part of polyhexamethylene adipamide (intrinsic viscosity=1.0) was added, and the mixture heated to 60° C. Solution was complete within 60 minutes. A second solution consisting of 1 part of paraformaldehyde, 1 part of methanol, and 0.0006 part of sodium hydroxide was prepared at 60° C. in a glass vessel. This solution was added to the polyamide solution over a 3½ minute period with good agitation. The reaction mixture was maintained at 60° C. and 25 minutes later 1 part of second-stage methanol was added. Five minutes later the mixture was discharged into 20 parts of 27% aqueous acetone and the resulting solution neutralized with aqueous ammonia. The product which precipitated was washed in running water, worked by hand for 10 minutes, and then dried at 50° C.

The reaction product contained 10.4% methoxyl groups which corresponds to about 45% of the amide groups in the original polyamide being substituted with methoxymethyl group. The dilution value of this product was 92. The product, N-methoxymethyl polyhexamethylene adipamide, was quite plastic and could be calendered into a smooth sheet or onto a fabric on conventional equipment.

From the standpoint of obtaining the more desirable polymers having the previously mentioned substitution of 25% or more of the amide groups, the most advantageous total reaction times, namely, the time of the initial reaction plus the reaction period following the addition of the second stage alcohol, are from 15 minutes to 1 hour with the second stage alcohol added at least 10 minutes after the reaction has started and at least 5 minutes before it is stopped. It is not necessary that the withheld alcohol be added at one time as a distinct portion since in some cases it is more satisfactory to add it portionwise or slowly in a continuous stream over a relatively long interval.

The preferred temperatures are between 50° and 100° C., 58° to 62° C. being particularly preferred. It is desirable to operate at a temperature so that the reaction is essentially complete in 15 to 60 minutes. It is to be noted, however, that the temperatures can range from as low as that which will still enable the formation of polyamide solutions of practical concentrations, namely, from 40° C. to the temperature at which degradation of the polyamide chain becomes objectionable which is about 150° C. At temperatures above 65° C. it is necessary, when methanol is used as the alcohol, to use superatmospheric pressure, but this procedure while not advantageous offers no difficulty.

The formaldehyde is best used in an amount of from 0.5 to 2.0 parts per part of polyamide. The amounts of formaldehyde and alcohol are interrelated. It is usually desirable to use the formaldehyde and alcohol in a 1 to 1 molar ratio, but the ratio can be varied from about 2 to 1 to 1 to 3. For convenience and economic reasons the preferred source of formaldehyde is 80% aqueous formaldehyde or a commercial grade of paraformaldehyde. Formaldehyde-yielding materials may also be used.

Alcohols other than methanol can be used in the practice of this invention. Examples of such alcohols include ethanol, propanol, isopropanol, butanol, octyl alcohol, lauryl alcohol, benzyl alcohol, ethylene glycol, and unsaturated alcohols, such as allyl alcohol. If a mixed alkoxymethyl derivative is desired, a mixture of alcohols can be used or the alcohol added in the second stage can be different from that added initially.

Organic acids other than formic acid which are solvents for the polyamide can also be used in carrying out the present reaction. Oxygen-containing acids, such as formic, acetic, chloroacetic and hydroxyacetic, are the most useful for the present purpose. Formic acid is preferred because of its availability, good solubility characteristics, and the ease with which the reaction is carried out in this solvent. Any concentration of formic acid can be used which is a solvent for the polyamide starting material. In the case of polyhexamethylene adipamide this concentration is from about 70% to 100%. The commercially available formic acid of 90% concentration is advantageously used.

The polyamides used in the practice of this invention are, as previously noted, the high molecular weight or fiber-forming polymers. Polyamides, such as polyhexamethylene adipamide or polyhexamethylene sebacamide or those derived from epsilon-aminocaproic acid, are usually used because they are most readily available commercially. The invention is most advantageously applied to the simple polyamides, as contrasted with the interpolyamides, since these polyamides are insoluble or difficultly soluble in such solvents as aqueous ethanol or methanol, and are rendered soluble by the process of this invention. However, the invention is also applicable to the more soluble types of polyamides, for example, the interpolyamides, since the reaction brings about valuable alterations in properties. An especially valuable property of all polyamides modified by the process of this invention is their ability to be converted into the insoluble state by means of heat, particularly when the heating is carried out in the presence of acid.

The polyamides useful in this invention, generally speaking, comprise the reaction product of a linear polymer-forming composition containing amide-forming groups, for example, reacting material consisting essentially of bifunctional molecules each containing two reactive groups which are complementary to reactive groups in other molecules and which include complementary amide-forming groups. These polyamides can be obtained by the methods given in the above mentioned patents and by other methods, for example, by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acid, and amino alcohols is intended to include the equivalent amide-forming derivatives of these reactants. The preferred polyamides obtained from these reactants have a unit length of at least 7, where "unit length" is defined as in United States Patents 2,071,253 and 2,130,948. The average number of carbon atoms separating the amide groups in these polyamides is at least two. These linear polyamides include also polymers, as for instance the polyester-amides, obtained by admixture of other linear polymer-forming reactants, as for instance glycol-dibasic acid mixtures or hydroxy acids, with the mentioned polyamide-forming reactants. On hydrolysis with hydrochloric acid the amino acid polymers yield the amino acid hydrochloride, and the diamine-dibasic acid polymers yield the diamine hydrochloride and the dibasic carboxylic acid, and the amino alcohol-dibasic acid polymers yield the amino alcohol hydrochloride and the dibasic carboxylic acid. The term "polyamide" is used in its broad sense and includes polythioamides, for example those described in United States Patent 2,201,172, and polysulfonamides, for example those obtained by reacting a disulfonyl halide with a diamine as described in United States Patents 2,321,890 and 2,321,891.

The present process, as has been pointed out previously, provides a method whereby the extent of conversion of amide groups in polymeric amides to N-alkoxymethyl amide groups can be varied and accurately controlled over a wide range. Further illustration of this fact is as follows: Procedure such as that previously described using 80% formaldehyde yields a N-methoxymethyl polyamide of dilution value 15 to 50 corresponding to approximately 14% to 37% substitution of amide groups. This range can be extended to a dilution value of 70, which corresponds to approximately 41% substitution, by replacing the 80% formaldehyde with paraformaldehyde. This degree of substitution in turn can be extended to a dilution value of more than 100, corresponding to above approximately 46% methoxymethyl substitution, by replacing 90% formic acid with anhydrous formic acid.

In addition to the better control over the degree of reaction, the present process as compared to the method wherein all the alcohol is added at the start of the reaction, is capable of producing products of improved solution stability which is apparently due to the higher ratio of N-alkoxymethyl to N-methylol groups. The present process is additionally advantageous in that the results can be obtained with cheaper forms of formaldehyde and formic acid. Thus the highest dilution value obtainable using 80% formaldehyde without withholding any methanol is about 35, whereas dilution values as high as 55 are readily obtained using 80% formaldehyde when a part of the methanol is added after the reaction has started. For these reasons this invention presents an economical and practical method for the manufacture of modified polyamides which are soluble in common organic solvents, especially aqueous methanol, aqueous ethanol and mixtures of alcohols and chlorinated hydrocarbons, e. g., methanol-chloroform mixtures. By reason of their good solubility the modified polyamides are useful in making clear, tough films and in applying coatings onto various materials to give smooth finishes of outstanding properties. The unsupported film is useful as a general wrapping film. Fabrics coated with pigmented N-alkoxymethyl polyamides can be flexed repeatedly without cracking and for this reason they are useful as substitutes for leather, e. g., in shoes, luggage, and upholstery. Coatings of N-alkoxymethyl polyamides and unsupported films thereof are resistant to penetration by gasoline and gasoline/benzene mixtures and are useful for the preparation of fuel containers and conduits. The N-alkoxymethyl polyamides can also be spun into filaments, yarns, or bristles, and can be molded into useful articles.

As mentioned above, the N-alkoxymethyl polyamides can be rendered insoluble by the simple expedient of heating at moderate temperatures (60°–100° C.) in the presence of a small amount of any one of a number of acid catalysts. This property of insolubilization is especially valuable since after application from solution the polymer can be rendered resistant even to the solvent from which it was applied.

As many apparently widely different embodiments of this invention may be made without departing from the spirit and scope thereof, it is to be understood that we do not limit ourselves to the specific embodiments thereof except as defined in the appended claims.

We claim:

1. A process for preparing N-alkoxymethyl polyamides which comprises heating a liquid solution in carboxylic acid of a synthetic linear polyamide of intrinsic viscosity above 0.4 with formaldehyde and an alcohol in which the nonhydroxyl portion consists of a hydrocarbon radical to at least 40° C. and below the temperature at which serious degradation of the polyamide chain occurs, the formaldehyde being present in amount by weight of from 0.5 to 2 parts for 1 part of polyamide in said solution, and said alcohol being present in amount by weight of from 0.5 to 1.5 parts for 1 part of said last mentioned polyamide, and then after the reaction has proceeded for a period of from 5 to 25 minutes adding to the reaction mixture an additional quantity of said alcohol in amount by weight of from 0.5 to 4 parts for 1 part of polyamide, the molar ratio of formaldehyde to total alcohol used being from 2:1 to 1:3, and continuing the reaction until more than 15% of the amide groups have been converted into N-alkoxymethyl groups, said last mentioned polyamide having recurring hydrogen-bearing amide groups as an integral part of the main polymer chain and being a synthetic linear polycarbonamide wherein the average number of carbons in the segments of the chain separating the amide groups is at least 2.

2. A process for preparing N-alkoxymethyl polyamides which comprises heating a solution in formic acid of a fiber-forming synthetic linear polyamide with formaldehyde and methanol to at least 40° C. and below the temperature at which serious degradation of the polyamide chain occurs, the formaldehyde being present in amount by weight of from 0.5 to 2 parts for 1 part of polyamide in said solution and the methanol being present in amount by weight of from 0.5 to 1.5 parts for 1 part of said last mentioned polyamide, and then after the reaction has proceeded for a period of from 5 to 25 minutes adding to the reaction mixture additional methanol in amount by weight of from 0.5 to 4 parts for 1 part of polyamide, the molar ratio of formaldehyde to total methanol used being from 2:1 to 1:3 and continuing the reaction until more than 25% of the amide groups have been converted into N-methoxymethyl groups, said last mentioned polyamide having recurring hydrogen-bearing amide groups as an integral part of the main polymer chain and being a synthetic linear polycarbonamide wherein the average number of carbons in the segments of the chain separating the amide groups is at least 2.

3. A process for preparing N-methoxymethyl polyhexamethylene adipamide which comprises heating a solution in formic acid of polyhexamethylene adipamide of intrinsic viscosity above 0.4 with formaldehyde and methanol to at least 40° C. and below the temperature at which serious degradation of the polyamide chain occurs, the formaldehyde being present in amount by weight of from 0.5 to 2 parts for one part of the polyhexamethylene adipamide in said solution and the methanol being present in amount by weight of from 0.5 to 1.5 parts for 1 part of the polyhexamethylene adipamide, and then after the reaction has proceeded for a period of from 5 to 25 minutes adding to the reaction mixture additional methanol in amount by weight of from 0.5 to 4 parts for 1 part of the polyhexamethylene adipamide, the molar ratio of formaldehyde to total methanol used being from 2:1 to 1:3, and continuing the reaction until more than 25% of the amide groups have been converted into N-methoxymethyl groups.

4. A process for preparing N-alkoxymethyl polyhexamethylene adipamide which comprises heating a liquid solution in formic acid of fiber-forming polyhexamethylene adipamide with formaldehyde and an alcohol in which the non-hydroxyl portion consists of a hydrocarbon radical to at least 40° C. and below the temperature at which serious degradation of the polyamide chain occurs, the formaldehyde being present in amount by weight of from 0.5 to 2 parts for 1 part of the polyhexamethylene adipamide in said solution and said alcohol being present in amount by weight of from 0.5 to 1.5 parts for 1 part of the polyhexamethylene adipamide, and then after the reaction has proceeded for a period of from 5 to 25 minutes adding to the reaction mixture an additional quantity of said alcohol in amount by weight of from 0.5 to 4 parts for 1 part of the polyhexamethylene adipamide, the molar ratio of formaldehyde to total alcohol used being from 2:1 to 1:3, and continuing the reaction until more than 25% of the amide groups have been converted into N-alkoxymethyl groups.

5. A process for preparing from a polyamide, alcohol, and formaldehyde, N-alkoxymethyl polyamides which comprises the steps of conducting the reaction in at least two stages wherein a portion of the total alcohol is withheld from an initial reaction stage and added to the reaction mixture at a subsequent stage, said steps comprising heating to at least 40° C. and below the temperature at which serious degradation of the polyamide chain occurs, a liquid solution in carboxylic acid of synthetic linear polyamide of intrinsic viscosity above 0.4 having recurring hydrogen-bearing amide groups as an integral part of the main polymer chain with formaldehyde in amount by weight of from 0.5 to 2 parts for one part of polyamide in said solution, and with an alcohol in which the non-hydroxyl portion consists of a hydrocarbon radical in amount of from 0.5 to 1.5 parts of alcohol for 1 part of said synthetic linear polyamide, and in an amount of substantially equimolecular ratio with the formaldehyde, and then after the reaction has proceeded for a period of from 5 to 25 minutes adding to the reaction mixture a further quantity of said alcohol in amount of from 0.5 to 4 parts for 1 part of polyamide, and continuing the heating after said last mentioned addition of alcohol until a N-alkoxymethyl polyamide having at least 25% of its amide groups substituted with alkoxymethyl groups is obtained, said synthetic linear polyamide being a polycarbonamide wherein the average number of carbons in the segments of the chain separating the amide groups is at least 2.

6. A process for preparing from a polyamide, alcohol, and formaldehyde, N-alkoxymethyl polyamide which comprises the steps of conducting the reaction in at least two stages wherein a portion of the total alcohol is withheld from an initial reaction stage and added to the reaction mixture at a subsequent stage, said steps comprising heating to at least 40° C. and below the temperature at which serious degradation of the polyamide chain occurs, a liquid solution in carboxylic acid of synthetic linear polyamide of intrinsic viscosity above 0.4 having recurring hydrogen-bearing amide groups as an integral part of the main polymer chain with formaldehyde in amount by weight of from 0.5 to 2 parts for one part of polyamide in said solution, and with methanol in amount of from 0.5 to 1.5 parts of methanol for 1 part of said synthetic linear polyamide and in an amount of substantially equimolecular ratio with the formaldehyde, and then after the reaction has proceeded for a period of from 5 to 25 minutes adding to the reaction mixture additional methanol in the amount of from 0.5 to 4 parts for 1 part of polyamide, and continuing the reaction until an alkoxymethyl polyamide is obtained having at least 25% of its amide groups substituted with alkoxymethyl groups, said synthetic linear polyamide being a polycarbonamide wherein the average number of carbons in the segments of the chain separating the amide groups is at least 2.

7. A process for preparing from a polyamide, alcohol, and formaldehyde, N-alkoxymethyl polyhexamethylene adipamide which comprises the steps of conducting the reaction in at least two stages wherein a portion of the total alcohol is withheld from an initial reaction stage and added to the reaction mixture at a subsequent stage, said steps comprising heating, to at least 40° C. and below the temperature at which serious degradation of the polyamide chain occurs, a liquid solution in carboxylic acid of polyhexamethylene adipamide of intrinsic viscosity above 0.4 with formaldehyde in amount by weight of from 0.5 to 2 parts for one part of polyhexamethylene adipamide in said solution, and with an alcohol in which the non-hydroxyl portion consists of a hydrocarbon radical in amount of from 0.5 to 1.5 parts of alcohol for 1 part of polyhexamethylene adipamide and in an amount of substantially equimolecular ratio with the formaldehyde, continuing heating the reaction mixture for a total period of from 15 minutes to 1 hour, and adding to the reaction mixture from 0.5 to 4 additional parts of said alcohol for 1 part of the polyhexamethylene adipamide during said continued heating at a time of from at least 5 minutes after the beginning of the reaction with said first mentioned amount of alcohol to at least 5 minutes before the end of said total period.

8. A method for preparing from polyamide, alcohol, and formaldehyde, N-alkoxymethyl polyamides which comprises the steps of conducting the reaction in at least two stages wherein a portion of the total alcohol reacted is withheld from an initial reaction stage and added to the reaction mixture at a subsequent stage, said steps comprising heating between 50° and 100° C. a liquid solution in carboxylic acid of synthetic linear polyamide of intrinsic viscosity above 0.4 having recurring hydrogen-bearing amide groups as an integral part of the main polymer chain with formaldehyde in amount of from 0.5 to 2 parts for 1 part of polyamide in said solution, and with an alcohol in which the non-hydroxyl portion consists of a hydrocarbon radical in amount of from 0.5 to 1.5 parts for 1 part of said last mentioned polyamide and in an amount of substantially equimolecular ratio with the formaldehyde, containing heating the reaction mixture for a total period of from 15 minutes to 1 hour, and adding to the reaction mixture from 0.5 to 4 additional parts of said alcohol for 1 part of said polyamide during said continued heating at a time of from at least 5 minutes after the beginning of the reaction with said first mentioned amount of alcohol to at least 5 minutes before the end of said total period, said synthetic linear polyamide being a polycarbonamide wherein the average number of carbons in the segments of the chain separating the amide groups is at least 2.

9. The method set forth in claim 8 in which said alcohol is methanol, said acid is formic, and the reaction temperature is between 58° and 62° C.

HENRY D. FOSTER.
ARTHUR W. LARCHAR.

REFERENCES CITED

The following references are of record in the file of this patent:

UNITED STATES PATENTS

| Number | Name | Date |
| --- | --- | --- |
| 2,071,250 | Carothers | Feb. 16, 1937 |
| 2,244,184 | Austin et al. | June 3, 1941 |

Certificate of Correction

Patent No. 2,430,923.　　　　　　　　　　　　　November 18, 1947.

HENRY D. FOSTER ET AL.

It is hereby certified that error appears in the printed specification of the above numbered patent requiring correction as follows: Column 13, line 24, claim 8, for the word "containing" read *continuing*; and that the said Letters Patent should be read with this correction therein that the same may conform to the record of the case in the Patent Office.

Signed and sealed this 17th day of February, A. D. 1948.

[SEAL]

THOMAS F. MURPHY,
*Assistant Commissioner of Patents.* continued heating at a time of from at least 5 minutes after the beginning of the reaction with said first mentioned amount of alcohol to at least 5 minutes before the end of said total period.

8. A method for preparing from polyamide, alcohol, and formaldehyde, N-alkoxymethyl polyamides which comprises the steps of conducting the reaction in at least two stages wherein a portion of the total alcohol reacted is withheld from an initial reaction stage and added to the reaction mixture at a subsequent stage, said steps comprising heating between 50° and 100° C. a liquid solution in carboxylic acid of synthetic linear polyamide of intrinsic viscosity above 0.4 having recurring hydrogen-bearing amide groups as an integral part of the main polymer chain with formaldehyde in amount of from 0.5 to 2 parts for 1 part of polyamide in said solution, and with an alcohol in which the non-hydroxyl portion consists of a hydrocarbon radical in amount of from 0.5 to 1.5 parts for 1 part of said last mentioned polyamide and in an amount of substantially equimolecular ratio with the formaldehyde, containing heating the reaction mixture for a total period of from 15 minutes to 1 hour, and adding to the reaction mixture from 0.5 to 4 additional parts of said alcohol for 1 part of said polyamide during said continued heating at a time of from at least 5 minutes after the beginning of the reaction with said first mentioned amount of alcohol to at least 5 minutes before the end of said total period, said synthetic linear polyamide being a polycarbonamide wherein the average number of carbons in the segments of the chain separating the amide groups is at least 2.

9. The method set forth in claim 8 in which said alcohol is methanol, said acid is formic, and the reaction temperature is between 58° and 62° C.

HENRY D. FOSTER.
ARTHUR W. LARCHAR.

REFERENCES CITED

The following references are of record in the file of this patent:

UNITED STATES PATENTS

| Number | Name | Date |
|---|---|---|
| 2,071,250 | Carothers | Feb. 16, 1937 |
| 2,244,184 | Austin et al. | June 3, 1941 |

Certificate of Correction

Patent No. 2,430,923. November 18, 1947.

HENRY D. FOSTER ET AL.

It is hereby certified that error appears in the printed specification of the above numbered patent requiring correction as follows: Column 13, line 24, claim 8, for the word "containing" read *continuing*; and that the said Letters Patent should be read with this correction therein that the same may conform to the record of the case in the Patent Office.

Signed and sealed this 17th day of February, A. D. 1948.

[SEAL]

THOMAS F. MURPHY,
*Assistant Commissioner of Patents.*